Sept. 14, 1948.  G. H. LIEBEGOTT  2,449,491
MEANS TO PREVENT SHIFTING OF
LADING IN FREIGHT CARRIERS
Filed Oct. 1, 1947  2 Sheets-Sheet 1
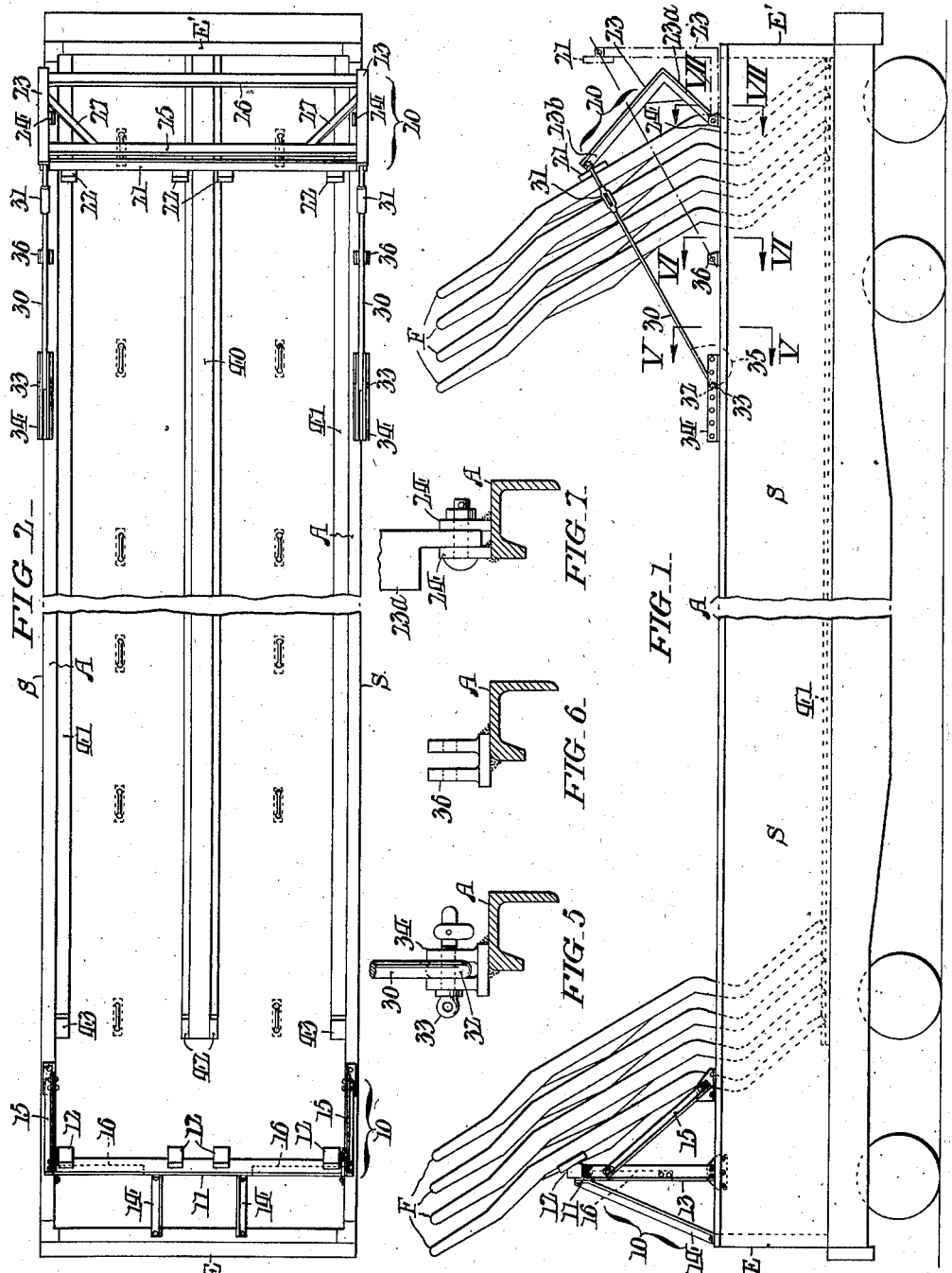
WITNESSES
Thomas W. Kerr, Jr.
A. J. Brittingham
INVENTOR:
George H. Liebegott,
BY Paul & Paul
ATTORNEYS.

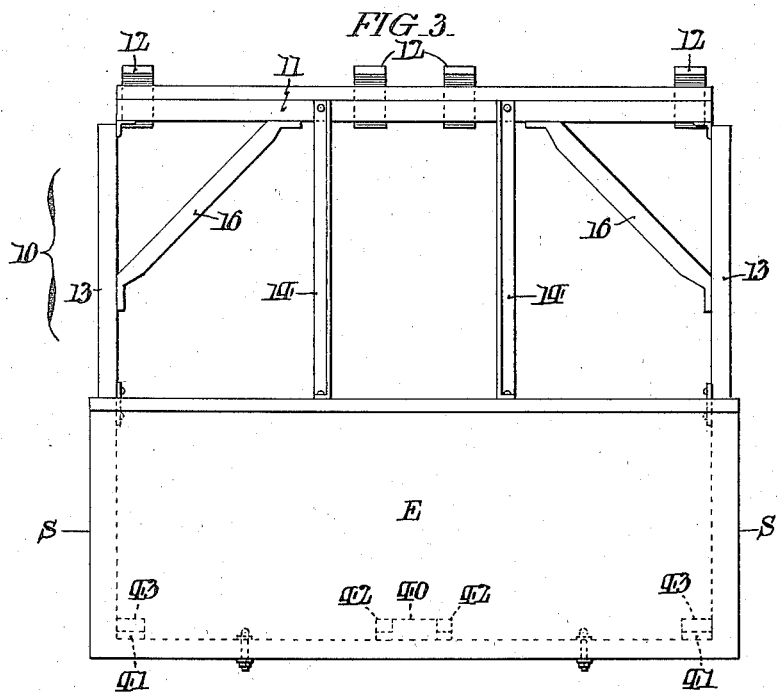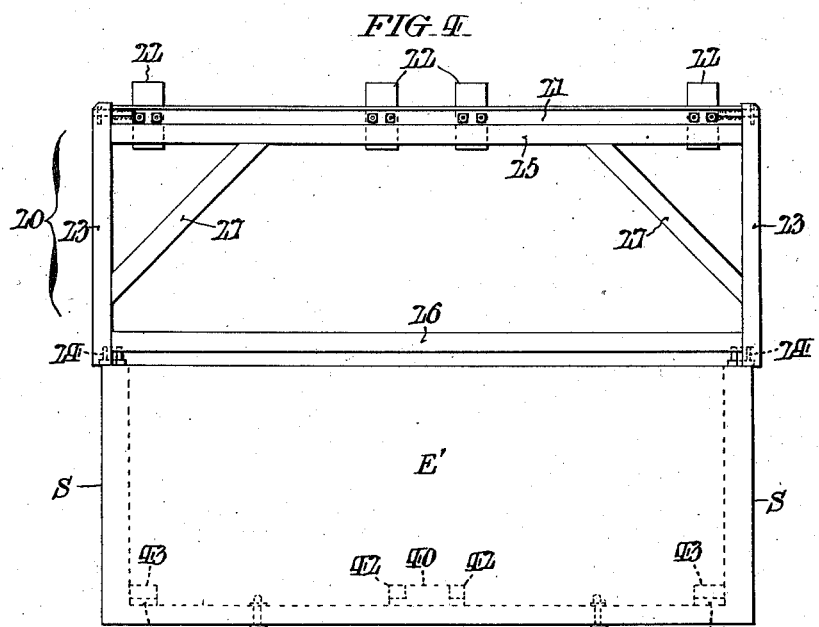

Patented Sept. 14, 1948

2,449,491

UNITED STATES PATENT OFFICE 2,449,491

MEANS TO PREVENT SHIFTING OF LADING IN FREIGHT CARRIERS

George H. Liebegott, Philadelphia, Pa., assignor to The Pennsylvania Railroad Company, Philadelphia, Pa., a corporation of Pennsylvania Application October 1, 1947, Serial No. 777,149

7 Claims. (Cl. 105—369)

This invention relates to means for preventing shifting of packs of relatively large and heavy articles such as automobile chassis frames and the like during transit in freight carriers.

The chief aim of my invention is to provide a means for the above stated purpose which can be readily installed in the carriers at small expense; which requires but a minimum space for its accommodation; which favors close packing of the articles uprightly and backed flat one against another; which is so constructed with parts so arranged as to be retractable out of the way to allow full access to the freight space in the carrier during loading and use of the carrier for bulk materials or other kinds of freight; and which, moreover, can be easily and quickly manipulated to secure the freight articles after loading.

Other objects and attendant advantages will appear from the following detailed description of the attached drawings, wherein Fig. 1 is a view in side elevation of a freight transporting carrier conveniently embodying my invention.

Fig. 2 shows the organization in top plan.

Figs. 3 and 4 respectively show the left and right hand end elevations of the car.

Figs. 5, 6, and 7 are fragmentary sectional views taken as indicated respectively by the angled arrows V—V, VI—VI and VII—VII in Fig. 1.

The freight transporting carrier chosen for convenience of illustration herein is in the form of a railway car having a body of the gondola type with side and end walls S, S and E, E', the side walls being respectively provided at the top after customary practice, with edge stiffening angles A.

The freight displacement prevention means with which my invention is more especially concerned, includes a bracket-like superstructure 10 which is mounted adjacent one end of the car body. As shown, this superstructure 10 comprises a transverse angle bar 11 with attached pads 12 of wood or the like, against which is adapted to serve as a buttress for the first of a series of automobile chassis frames F or the like set up on end and backed one against another throughout the length of the car. The bar 11 it will be noted is disposed at a level well above that of the chassis frame centers by upright angle bars 13 secured to the sides S of the car body and braced by suitably arranged struts 14, 15 and 16.

Cooperative with the buttressing superstructure 10 in securing the chassis frame pack against shifting in the car body in accordance with my invention, is a retaining element which is comprehensively designated 20 and shown as comprising a transverse bar 21 with pads 22 similar to the pack 12 previously referred to for contacting the last chassis frame F in the series at a level above the center thereof. The bar 21 is pivotally connected to the tops of the side arms 23 of right angular configuration, said arms being hinged at their other ends to clevis lugs 24 affixed to the edge stiffening bars A at the tops of the side walls S of the car body by welding as conventionally indicated in Fig. 7. The side arms 23 of the retaining element 20 are rigidly connected by transverse members 25, 26, and braced by struts 27 as best shown in Fig. 4. It is to be noted that the lugs 24 are so located that upon retraction of the retaining element 20 to the inactive dot and dash line position in Fig. 1 with the extremities 23a of the arm 23 resting flat upon the stiffening flanges A of the car side walls S, the extremities 23b of said side arms are caused to assume a vertical position in the plane of the end wall E' of the car with the retaining element 20 so retracted out of the way the whole of the interior of the car is freely accessible for lading.

For the purpose of drawing up upon the retaining element 20 and thereby binding the chassis frame pack in place, I have provided in accordance with my invention a pair of tie rods 30 each composed of two aligned sections which are jointed by a turn buckle 31. Each tie rod 30 is pivotally connected at one end to the swinging end of one of the side arms 23 of the retaining element 20 and at its other end is formed with an eye 32 for passage of a self-locking anchorage pin 33. This pin 33 is adapted to be selectively inserted into apertures spaced along a bar 34 welded or otherwise fixedly secured longitudinally of the top of the corresponding side wall S of the car body at a region relatively remote from the end wall E'. With this arrangement after the car is loaded and the retaining element 20 swung inward to the active position in which it is shown in full lines in Fig. 1, the eye ends 32 of the tie rods 30 are registered with the most convenient of the holes in the bars 34, the pins 33 are inserted, whereupon the turn buckle 31 are finally adjusted to draw up tight upon said element 20. In order to prevent loss of the pins 33, they are attached to the respective tie rods 30 by chains as instanced at 35 in Fig. 1. In order that the tie rods 30 may also be made to serve as a means for the retraining element 20 in the retracted position I have additionally provided auxiliary clevis lugs 36 at opposite sides of the car for connection of the eye ends 32 of said rods by the pins 33 as indicated in dot and dash lines in Fig. 1.

For further insurance against shifting of the lading during transit, I have provided within the car body at the bottom, longitudinally extending wooden strips 40 and 41, respectively at the center end along opposite sides for direct support of the frames. To these strips are secured at one end of the car, blocks 42 and 43 which act as stops for the rested end of the first chassis frame F in the series and which in conjunction with the buttress element 10 determines the angle of repose of said frame as well as that of the other subsequently introduced into the car.

While I have herein, by the way of example, shown and described my invention as embodied in a railway car, it is not to be regarded as limited to such use, since, through suitable modifications it can be as readily embodied in other types of freight transporting carriers such as ships and cargo aircraft without sacrifice of any of the advantages herein before pointed out.

Having thus described my invention, I claim:

1. Means to prevent shifting of freight such as automobile chassis frames set up on end and backed one against another in the direction of the length of the body of a transporting carrier, including a fixed transverse member disposed adjacent one end of the body of the carrier at a level above that of the chassis frame centers to serve as a buttress against which the first chassis frame of the series is leaned; a cooperating retaining element pivoted adjacent the opposite end of the carrier body for inward swinging movement, the latter element having a transverse member adapted to bear against the last chassis frame in the series above center; and adjustable means for drawing upon the retaining element to secure the pack of chassis frames.

2. The invention according to claim 1, wherein the drawing means comprises a pair of tie rods with turn buckle united sections pivoted, each at one end, to the swinging end of the restraining element, said rods having eyes at their opposite ends, retractable anchorage pins adapted to be passed through the eye ends and selectively inserted into spaced apertures respectively arranged longitudinally on opposite sides of the carrier body.

3. The invention according to claim 1, further including laterally-spaced strips along the carry body at the bottom to directly support the chassis frames, and blocks upstanding from said strips adapted, by coaction with the buttress element, to determine the angle of repose of the first chassis frame in the series.

4. Means to prevent shifting of freight such as automobile chassis frames or the like set up on end and backed one against another in the direction of the length of the body of a railway car of the gondola type, including a fixed transverse member disposed adjacent one end of the car body at a level above that of the chassis frame centers to serve as a buttress against which the first chassis frame in the series is leaned; a cooperating retaining element adjacent the opposite end of the car, the latter element having side arms respectively pivoted to the top edges of the side walls of the car, and a cross bar extending between said side arms to bear above center against the last chassis frame in the series; and adjustable means for drawing upon the retaining element to secure the pack of chassis frames.

5. The invention according to claim 4, wherein the drawing means comprises a pair of rods with turn buckle-united sections pivotedly connected at one end to the swinging end of the retaining element and having eyes at their opposite ends, and retractable anchorage pins adapted to be passed through the eye ends of the rods and selectively inserted into spaced apertures respectively arranged longitudinally on opposite side walls of the car body.

6. The invention according to claim 4, wherein the side arms of the clamp element are of right angle configuration, each so proportioned that upon retraction of said element, one extremity rests upon the top of the corresponding side wall of the car body and the other extremity assumes an upright position in alignment with the end wall of the car body.

7. The invention according to claim 4, further including laterally-spaced strips along the bottom of the car body to directly support the chassis frames and blocks upstanding from said strips adapted by coaction with the buttress element, to determine the angle of repose of the first chassis frame in the series.

GEORGE H. LIEBEGOTT.

REFERENCES CITED

The following references are of record in the file of this patent:

UNITED STATES PATENTS

| Number | Name | Date |
|---|---|---|
| 2,283,308 | Bean | May 19, 1942 |
| 2,283,309 | Bean et al. | May 19, 1942 |